UNITED STATES PATENT OFFICE.

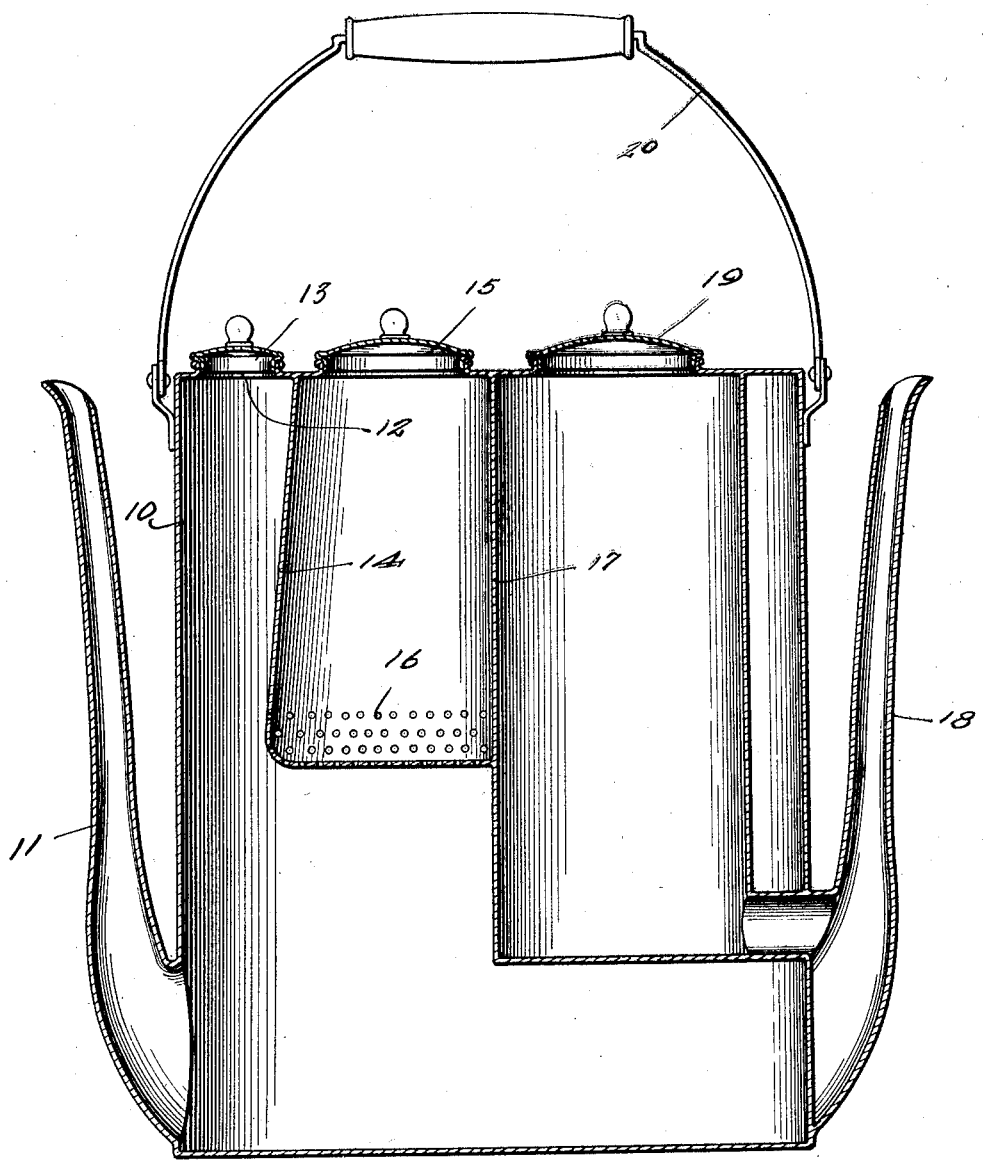

BARNOT RUBIN, OF PHILADELPHIA, PENNSYLVANIA.

COFFEE-POT.

1,385,891.  Specification of Letters Patent.  Patented July 26, 1921.

Application filed June 13, 1921. Serial No. 477,239.

*To all whom it may concern:*

Be it known that I, BARNOT RUBIN, a citizen of the United States, residing at Philadelphia, in the county of Philadelphia and State of Pennsylvania, have invented new and useful Improvements in Coffee-Pots, of which the following is a specification.

This invention relates to coffee pots or the like, and embodies among other features, a coffee receptacle and a milk receptacle arranged within the coffee pot in a manner to be surrounded by the water contained in said pot so that the milk is heated while the coffee is being made.

In carrying out the invention, the coffee pot is provided with two spouts, one communicating with the coffee pot proper, and the other communicating with the milk receptacle.

The nature and advantages of the invention will be better understood when the following detailed description is read in connection with the accompanying drawing, the invention residing in the construction, combination, and arrangement of parts as claimed.

The figure in the drawing is a vertical sectional view through the coffee pot constructed in accordance with my invention.

Referring to the drawings in detail, 10 indicates the coffee pot which may be constructed from any suitable material, and may also vary in size and configuration without departing from the spirit of the invention. The coffee pot is provided with the usual spout 11. The pot is provided with an opening 12 for the admittance of water, which opening is normally closed by a removable cover 13.

In accordance with the present invention, the pot is divided to provide a coffee receiving receptacle 14 which opens at the top of the pot and normally is closed by a cover 15. The lower portion of the receptacle 14 is perforated as at 16. The pot 10 is also formed to provide a milk receptacle 17 arranged in juxta-position to the coffee receptacle 15 and consequently larger than the latter, the milk receptacle being in communication with a spout 18 arranged upon the side of the pot 10 directly opposite the spout 11. The milk receptacle 17 opens at the top of the pot so that access may be readily had thereto, the receptacle being normally closed by a removable cover 19. The pot is provided with a handle 20 which may be of any suitable construction and arranged in any suitable manner.

In practice, the coffee pot 10 is filled or partly filled with water through the opening 12, the coffee being placed in the receptacle 14, and a proper amount of milk placed in the receptacle 17. The coffee receptacle 14 and the milk receptacle 17 are arranged in spaced relation to the wall of the pot 10 so as to be surrounded by the water contained in the pot. Consequently, when the pot is placed upon the stove and the water heated, the water circulates through the perforations 16 of the coffee receptacle 14, and during the process of making the coffee, the milk in the receptacle 17 is simultaneously heated. It is a well known fact that hot milk materially improves the taste of coffee, and the construction is such that the coffee can be easily poured from the pot through the spout 11 and the milk poured from the receptacle 17 through the spout 18. It is also to be understood that the receptacles 14 and 17 can vary in size and configuration without departing from the spirit of the invention.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:—

1. A coffee pot including a spout, a coffee receptacle arranged within the pot and having perforations, a milk receptacle arranged within the pot, a spout arranged at one side of the pot and communicating with the milk receptacle, and said coffee and milk receptacles being spaced from the wall of the pot for the purpose specified.

2. A coffee pot having an opening in the top thereof for the admittance of water, a removable cover normally closing said opening, a spout leading from said pot, a coffee receptacle arranged within the pot, and opening at the top thereof, a cover for said receptacle, said receptacle being perforated, a milk receptacle arranged within the pot and opening at the top thereof, a cover for said milk receptacle, the said receptacles being spaced from the wall of the pot, and a second spout communicating with the milk receptacle for the purpose specified.

In testimony whereof I affix my signature.

BARNOT RUBIN.